US008412701B2

(12) United States Patent
Shuma et al.

(10) Patent No.: US 8,412,701 B2
(45) Date of Patent: Apr. 2, 2013

(54) MULTI-DATASET GLOBAL INDEX

(75) Inventors: Kevin P. Shuma, Celina, TX (US);
Joseph B. Lynn, Plano, TX (US)

(73) Assignee: Computer Associates Think, Inc., Islandia, NY (US)

( * ) Notice: Subject to any disclaimer, the term of this patent is extended or adjusted under 35 U.S.C. 154(b) by 108 days.

(21) Appl. No.: 12/890,975

(22) Filed: Sep. 27, 2010

(65) Prior Publication Data
US 2012/0078879 A1  Mar. 29, 2012

(51) Int. Cl.
G06F 17/30 (2006.01)
(52) U.S. Cl. .................. 707/715; 707/741
(58) Field of Classification Search .......... 707/673, 707/696, 711, 741, 830, 715, E17.002, E17.049, 707/E17.057, E17.085
See application file for complete search history.

(56) References Cited

U.S. PATENT DOCUMENTS

| | | | |
|---|---|---|---|
| 5,551,027 A * | 8/1996 | Choy et al. ................ 1/1 |
| 5,806,065 A * | 9/1998 | Lomet ...................... 707/610 |
| 5,960,194 A * | 9/1999 | Choy et al. ................ 1/1 |
| 6,175,835 B1 * | 1/2001 | Shadmon ................. 707/696 |
| 6,249,784 B1 * | 6/2001 | Macke et al. ............. 1/1 |
| 6,374,232 B1 * | 4/2002 | Dageville et al. ........ 1/1 |
| 6,681,218 B1 * | 1/2004 | Zou ......................... 707/696 |
| 6,745,189 B2 * | 6/2004 | Schreiber ................. 707/696 |
| 6,778,977 B1 * | 8/2004 | Avadhanam et al. ..... 707/737 |
| 6,859,808 B1 * | 2/2005 | Chong et al. ............. 707/741 |
| 6,920,460 B1 * | 7/2005 | Srinivasan et al. ....... 1/1 |
| 7,158,996 B2 * | 1/2007 | Croisettier et al. ....... 707/741 |
| 7,356,549 B1 * | 4/2008 | Bruso et al. .............. 707/696 |
| 7,774,304 B2 * | 8/2010 | Banzon et al. ............ 707/609 |
| 2006/0074290 A1 * | 4/2006 | Chen et al. ................ 600/407 |
| 2006/0218123 A1 * | 9/2006 | Chowdhuri et al. ...... 707/2 |
| 2009/0228528 A1 * | 9/2009 | Ercegovac et al. ....... 707/203 |
| 2010/0153349 A1 * | 6/2010 | Schroth .................... 707/693 |
| 2010/0161569 A1 * | 6/2010 | Schreter ................... 707/696 |
| 2011/0022582 A1 * | 1/2011 | Unnikrishnan et al. .. 707/715 |
| 2011/0202541 A1 * | 8/2011 | Permandla et al. ....... 707/742 |

* cited by examiner

*Primary Examiner* — John E Breene
*Assistant Examiner* — Evan Aspinwall
(74) *Attorney, Agent, or Firm* — Womble Carlyle Sandidge & Rice, LLP

(57) ABSTRACT

A system and method is provided for partitioning a global index into multiple index datasets to house indexes and their index values. The index datasets may be stored in initialized physical index areas that are distinct from a standard physical index area.

15 Claims, 4 Drawing Sheets

MULTI-DATASET GLOBAL INDEX

TECHNICAL FIELD

The invention relates to the field of relational database systems and products. More particularly, the invention relates to managing indexes for relational databases.

BACKGROUND

Typically, a single index structure (also known as Global Index) provided for a relational database may be a data structure/repository that includes/stores all the indexes defined/created for a given set of tables in the database. A database management system may store/house the global index in a physical area allocated in a DASD (Direct Access Storage Device) which may be referred to as the Standard Index area. The database management system may utilize various index structures, for example, B-tree+ (Balanced Binary Tree), and/or other index structures, to organize the Global Index.

An index may be created for one or more columns of the database table and may refer to the definition of one given index definition that is specifically linked to a column(s)'s data value. An index entry may refer to one entry or index value that is in the index and references a given data row(s) of the database table. Most access requests within the relational database environment are based on index access. Index access typically refers to the pre-definition of a specific access path that is created using the value of a data column(s). When data rows are added to a database table, an index entry is created in the index using the value of the predefined column(s). Once created, the database can quickly retrieve data rows that have an index entry (data column value) that matches a given request criteria.

With the growth in the amount of data rows that are indexed and the number of indexes that are created, the size of the Global Index continues to grow. As the Global Index grows in size, processing requests using the Global Index becomes more costly and requires more resources. For example, as a B-tree+ Global Index grows, the amount of processing to navigate through the index tree also grows. As such, as more index definitions and/or more data rows are added, the index overhead increases.

These and other drawbacks exist.

SUMMARY

In some implementations, the invention relates to a system and method for partitioning a global index into multiple index datasets to house indexes and their index values. Instead of having a single global index that stores all the indexes for a set of tables in a relational database, the global index may be partitioned into smaller manageable pieces while not experiencing significant changes to index processing overhead.

When defining a physical index area for a global index, a user may create a standard index area (referred to as IXX). In addition, the user may create up to 99 additional index areas (referred to as I01 through I99). All indexes created by a user may be housed in the IXX area by default. However, users may select to house any index in one of the alternate index areas (I01 through I99). As such, the user may mix and match the indexes to house the indexes individually, to pair them up, etc., to meet business requirements. By allowing the user to select/specify the location for a given index (and its index entries), index processing performance may be improved.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
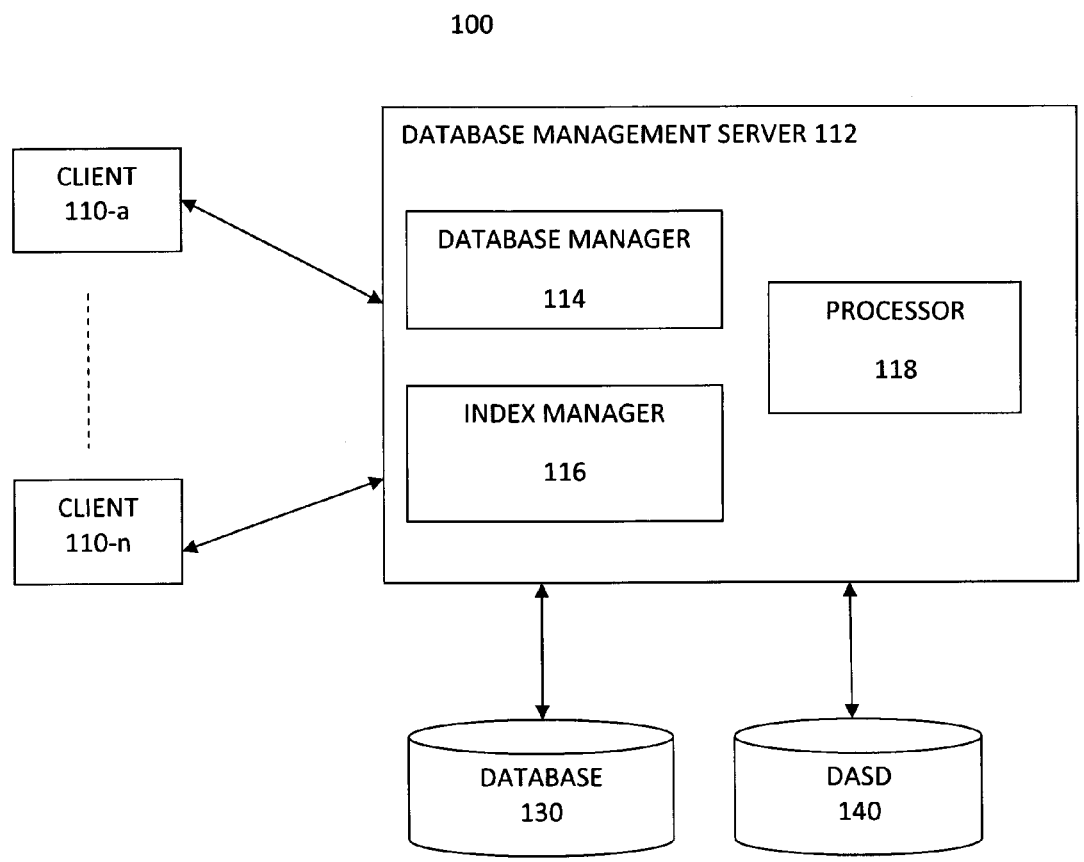
FIG. 1 illustrates an exemplary database management system, according to various aspects of the invention.

FIG. 1 is an exemplary illustration of a database management system 100, according to an aspect of the invention. Database management system 100 may include, among other things, at least a database management server 112 that is configured to manage one or more relational databases and/or indexes for the relational databases. Database management server 112 may be communicatively coupled to relational database(s) 130 that may store/maintain one or more database tables and data storage access device(s) (DASD) 140 that may store/maintain one or more indexes/index definitions for the tables in the database(s) 130. Database management server 112 may include a processor 118, circuitry and/or other hardware operable to execute computer-readable instructions. According to one aspect of the invention, database management system 100 may include one or more tangible computer-readable storage media configured to store one or more software modules, wherein the software modules include computer-readable instructions that when executed by the processor cause the processor to perform the functions described herein. According to one implementation, database management server 112 may comprise computer hardware programmed with a computer application having one or more software modules that enable the various features and functions of the invention. Non-limiting examples of the software modules in the application may include one or more of a database manager 114, an index manager 116, and/or other modules for performing the features and functions described herein.

Database administrators (or other users) may interact with the database management server 112 via one or more client devices 110-a, . . . , 110-n. Client devices 110a, . . . , 110-n may each comprise a user interface (not shown) that may enable users to perform various operations that may facilitate interaction with database management server 112 including, for example, providing requests to retrieve information from database tables, create tables, add/delete/update rows/columns in tables, create/delete/update/access one or more indexes/index definitions associated with the tables, partition indexes, and/or performing other operations. Client devices 110a, . . . , 110-n may include a processor (not shown), circuitry, and/or other hardware operable to execute computer-readable instructions.

According to one implementation, database manager 114 may manage various operations performed on the relational database(s) 130 and/or one or more database tables in the relational database(s) 130. For example, database manager 114 may receive user requests to create table(s), add row(s)/column(s), delete row(s)/column(s), update row(s)/column(s), retrieve information from row(s)/column(s), and/or other requests. Database manager 114 may convert the requests to queries that may be run against the relational database(s) 130 and may accordingly create one or more tables in the database(s) 130, add one or more rows/columns to the tables in database 130, delete one or more rows/columns from the tables in database 130, update one or more rows/columns in the tables in database 130, retrieve requested information from the tables in database 130, and/or perform other operations. In order to retrieve requested information from the database 130, database manager 114 may access one or more tables specified by the query (and/or user request) to determine the information within the tables that matches a given request criteria specified in the query. Database manager 114 may then retrieve the determined information from the tables and provide it to the user.

According to one implementation, index manager 116 may manage creation, deletion, updating, access, and/or other operations associated with one or more indexes/index definitions for the tables in relational database(s) 130. An index definition may refer to the description of the column(s) that are to be indexed. One or more index definitions associated with the tables/column(s) may be defined by a user at the time of table definition or alteration. Index manager 116 may utilize/access the one or more index definitions to manage (for example, create, update, delete, access, etc.) the indexes and/or the index entries. In one implementation, index manager 116 may create one or more indexes on one or more columns of one or more tables in database 130 based on one or more index definitions. In one implementation, index manager 116 may create the indexes in response to a user request.

When a data row is added to an indexed table, database manager 114 may provide an indication of the row addition to the index manager 116. Index manager 116 may accordingly, create an index entry in the index associated with the indexed table using the data value of the indexed column. Similarly, when a data row is deleted from or updated in an indexed table, database manager 114 may provide an indication to the index manager 116. The index manager 116 may accordingly, delete the appropriate index entry from the index or update the appropriate index entry in the index (for example, if the indexed column data value is changed/updated). When a request to retrieve particular information from a table in database 130 is received by database manager 114 (for example, in the form of search queries specifying an indexed column), database manager 114 may provide an indication to the index manager 116. Index manager 116 may perform an index access to determine one or more index entries that include data values associated with the indexed column. Index manager 116 may provide to database manager 114, the data row pointers from the determined index entries that identify or serve as pointers to a specific row(s) in a DASD (not shown) that stores the database table that contains the data values. Database manager 114 may accordingly retrieve one or more data rows associated with the data row pointers provided by the index manager 116 from the DASD that stores the table.

Figure 2:
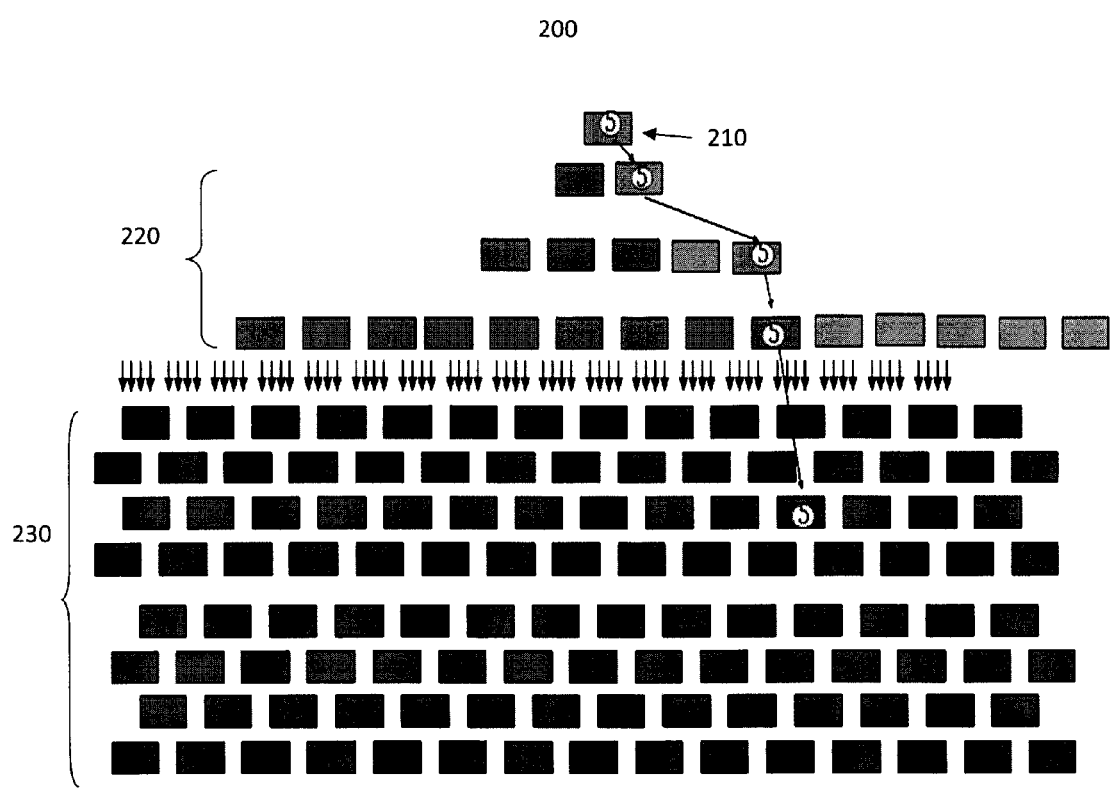
FIG. 2 illustrates an exemplary B-tree+ index structure for a global index, according to various aspects of the invention.

Index manager 116 may direct storage of the indexes/index definitions in DASD 140. In one implementation, index manager 116 may utilize various index structures, for example, B-tree+ (Balanced Binary Tree), and/or other index structures, to organize the indexes. The index entries containing the data values associated with an indexed column and the data row pointers may be stored in locations called leaves of the tree. The amount of processing required to navigate through the index tree to locate a particular leaf/index entry may be based on the order (i.e., maximum number of children per node) and depth (i.e., maximum number of access operations required to reach the desired leaf (index entry)) of the tree. FIG. 2, for example, depicts a B-tree+ index structure 200 for a global index defined for the tables in database 130. As can be seen in FIG. 2, four access operations may be required to reach a particular leaf node (index entry) among leaf nodes 230 (starting from root node 210 and navigating through intermediate nodes 220). As the global index grows, the amount of processing to navigate through the index tree also grows.

According to one implementation, the global index may be partitioned into a plurality of index datasets to house indexes and their index values. Each partitioned index dataset may also be a B-tree+ index structure. For example, a database table in database 130 may have 12 indexes associated with it. Two of the 12 indexes may be used on a daily basis whereas the other 10 may be used for monthly or yearly access. By separating the indexes used daily into their own index datasets, the size of the most used B-tree+ index structure may be reduced which improves performance for the separate indexes. In addition, the overall DASD 140 size for the index area may also be reduced, which may permit utilization of additional memory resident techniques to keep these index entries loaded into memory for significantly improved processing. During total index failure, the two daily used index datasets may be rebuilt after the failure thereby reducing the time it may take to get back up and running for daily work processes. Before running the monthly or yearly work processes, the lesser used indexes may be rebuilt. It will be understood that the above description for partitioning the global index into index datasets based on frequency of use (e.g., daily vs. monthly/yearly) is exemplary and other business criteria may be utilized to determine which indexes should be separated from the global index and/or which indexes should be housed separately in a separate index area other than the standard index area.

Index manager 116 may manage the partitioning of the global index into the plurality of index datasets. Index manager 116 may partition the global index based on one or more index definitions. In one implementation, an index definition associated with a particular column(s) to be indexed may include a name of at least one physical index area (for example, IXX, I01 ... I99) indicating the location where the index(es)/index entries associated with the column(s) is to be stored/housed. It will be understood that the names for the physical index areas used herein are exemplary and other names/mechanisms can be utilized to define/identify the physical index areas in the index definition without departing from the scope of this invention.

For example, for a database table named "customers" with three columns "customer name", "color of item" and state, a user may define one index definition for the column "color of item" which may include the name of the physical index area as IXX. Similarly, a user may define another index definition for the column "state" which may include the name of the physical index areas as I01. Based on the index definition for column "color of item", index manager 116 may create an index for the column "color of item" and may store the index in the standard physical index area IXX. In other words, index manager 116 may add the index entries associated with the index for column "color of item" to the global index (i.e., the B-tree+ index structure for the global index). Based on the index definition for column "state", index manager 116 may create an index for the column "state" and may store the index in the physical index area I01. In one implementation, index manager 116 may partition the global index by separating the index for column "state" into its own index dataset and may house the index dataset into the physical index area I01. In one implementation, index manager may add the index entries associated with the index for column "state" to the separated index dataset.

For one or more indexes created for one or more tables in database 130, index manager 116 may define a standard physical index area (referred to as IXX) and up to 99 additional physical index areas (referred to as I01 through I99) in DASD 140. In one implementation, index manager 116 may receive a request to define the physical index areas. In response to the request, index manager 116 may allocate and/or initialize the physical index areas in DASD 140. In one implementation, the request may be a user request (or other system/dynamic request). In some implementations, the additional index areas may be defined (allocated and/or initialized) along with the standard index area. In some implementations, the additional index areas may be defined as and when required (for example, when an index is to be housed in the index areas).

By default, all indexes created for the tables in database 130 may be housed in the standard physical area by index manager 116. In other words, the global index may be housed in the standard physical area IXX. According to one implementation, index manager 116 may house a particular index in one of the 99 additional physical index areas based on the index definition associated with the particular index. Index manager 116 may partition the global index by separating the particular index into its own index dataset and house the index dataset into the physical index area specified in the index definition. The remaining indexes may be housed in the standard physical area. Allowing a user to select/specify/define the location of a given index (and its index entries) provides for improved performance and allows 24×7 processing. A user can thus mix and match the indexes to house the indexes individually, to pair them up, etc., in order to meet business requirements.

In some implementations, a user may change index definition(s) to alter the name of the physical index area (i.e., from a previous value to a new desired value). For example, the name may be changed from standard index area IXX to an index area I02.

Index manager 116 may make a determination regarding whether index area I02 already exists or whether index area I02 is new (in response to the user changes, for example). In response to a determination that index area I02 already exists, index manager 116 may, based on the user changes, remove index entries associated with the corresponding index (i.e., index created based on the index definition that was changed) from standard index area IXX and may add those index entries to the physical index area I02. In response to a determination that index area I02 is new, index manager 116 may initialize physical area I02 (based on user request, for example), and may then store the index entries in the newly initialized/allocated index area I02.

Figure 3:
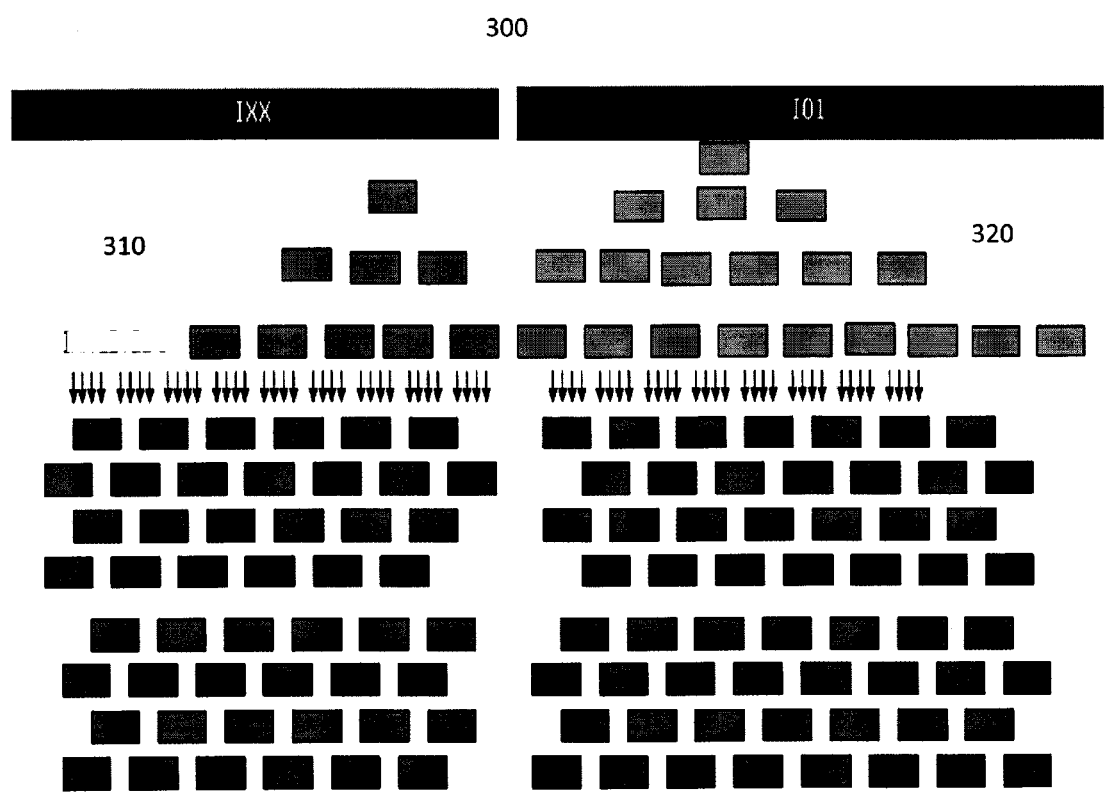
FIG. 3 illustrates an exemplary partitioned global index, according to various aspects of the invention.

FIG. 3 depicts an exemplary partitioned global index 300. Global index 200 of FIG. 2 may be partitioned by index manager 116 to create partitioned global index 300, wherein global index 200 is partitioned such that at least one index is separated from the global index and housed in index area I01. Global index 200 may be re-balanced into two B-tree+ indexes 310 and 320, as shown in FIG. 3. The two trees may not have an even split. Physical index area I01 may house the separated index(es) whereas standard index area IXX may house the remaining index(es). As can be seen, for example, in the case of the IXX index area, instead of four access operations, three access operations may be required to reach a particular leaf node, thereby improving index request processing performance.

Figure 4:
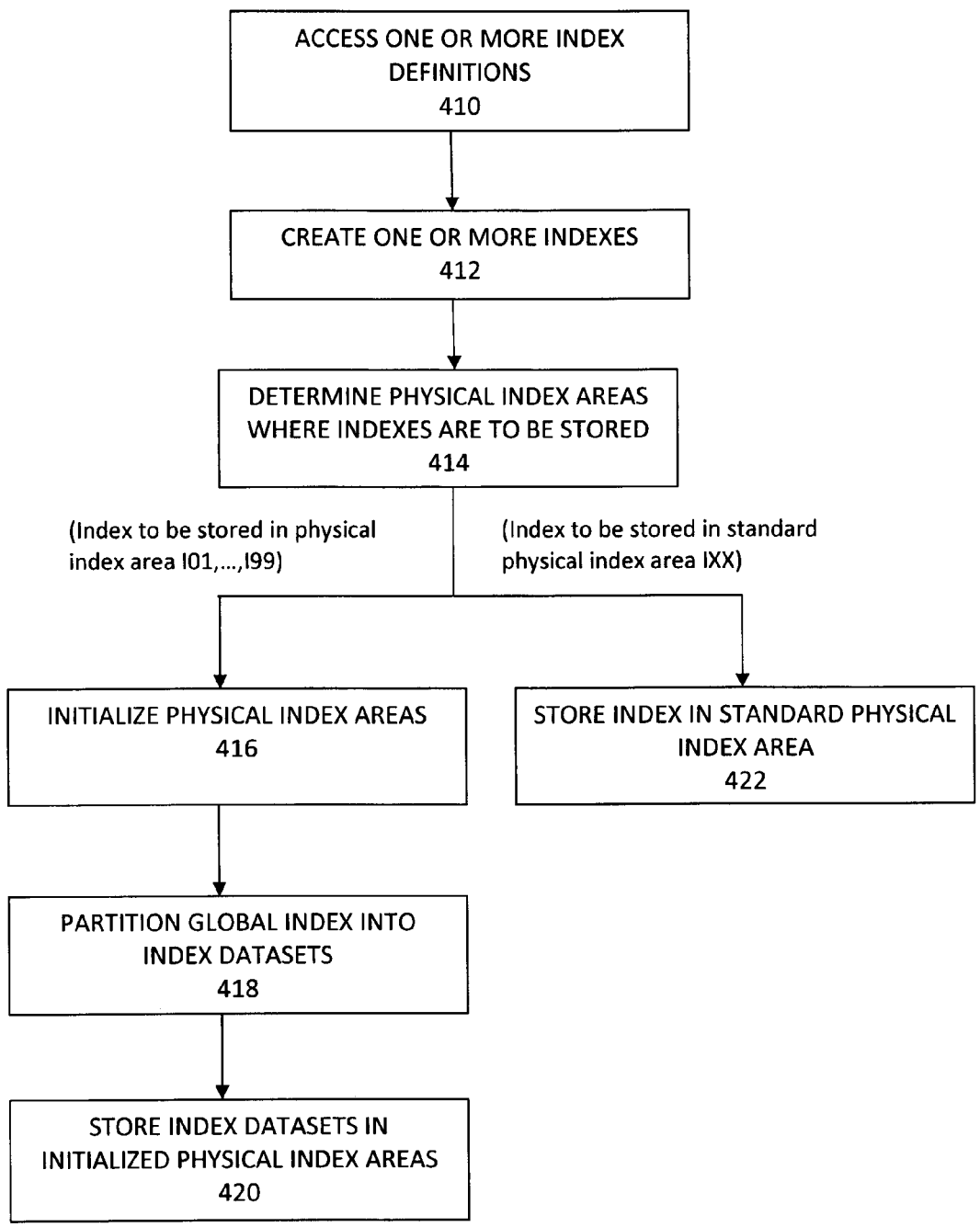
FIG. 4 is a flowchart depicting example operations performed by a database management system, according to various aspects of the invention.

FIG. 4 is a flowchart depicting example operations performed by a database management system 100 to partition a global index, according to various aspects of the invention. In some implementations, the example operations may be performed by index manager 116. In some implementations, various operations may be performed in different sequences. In other implementations, additional operations may be performed along with some or all of the operations shown in FIG. 4. In yet other implementations, one or more operations may be performed simultaneously. In yet other implementations, one or more operations may not be performed. Accordingly, the operations described are exemplary in nature and, as such, should not be viewed as limiting.

In operation 410, index manager 116 may access one or more index definitions associated with one or more columns to be indexed in a database table. In one implementation, the index definitions may be defined by a user at the time of table definition or alteration. In one implementation, an index definition associated with a particular column(s) to be indexed may include a name of one or more physical index areas (for example, IXX, I01 . . . I99) indicating the location where the index(es) associated with the column(s) is to be stored/housed.

In operation 412, index manager 116 may create one or more indexes for the one or more indexed columns based on the index definitions. In operation 414, index manager 116 may determine the physical index areas (i.e., IXX, I01 . . . I99) where the one or more indexes are to be stored/housed. In other words, index manager 116 may determine whether the one or more indexes are to be stored/housed in the standard physical index area (IXX) or the additional physical index areas (I01, . . . , I99). The index manager 116 may determine the physical index area based on the index definitions.

In response to a determination that at least one of the one or more indexes is to be stored/housed in one of the one or more physical index areas (i.e., from index areas I01-I99), the physical index area may be allocated and/or initialized in operation 416. In operation 418, the global index may be partitioned such that the at least one index (and the associated index entries) is separated from the global index into its own index dataset. The B-tree+ index structure for the global index may be partitioned to create at least two B-tree+ index structures, one for the separated index and the other for the remaining indexes. In operation 420, the separated index dataset(s) may be stored into the respective allocated/initialized physical index area(s). The remaining indexes may be housed in the standard physical area. In response to a determination that an index is to be stored/housed in the standard index area IXX, the index entries associated with the index may be added to the global index in the standard index area IXX, in operation 422.

In one implementation, when an index is created (e.g., newly created), index manager 116 may automatically house the index in the standard index area (e.g., by adding the index entries to the B-tree+ global index) by default. In one implementation, in response to creation of an index (e.g., new index), index manager 116 may access the index definition associated with the index to determine the location for the index (and its index entries). Index manager 116 may determine an index area where the index is to be stored and may accordingly store the index in the appropriate index area (e.g., standard or additional index areas). Index manager 116 may determine whether the determined index area has been initialized. In some implementations, if the determined index area is not yet initialized, index manager 116 may provide an indication to a user that the index area has not been initialized. In some implementations, in response to the indication, the user may cause the index area to be initialized and the index to be stored in the index area. If the determined index area has been initialized and/or already has an index stored in it, index manager 116 may store the index in the index area and/or add the index entries associated with the created index to the already stored index.

In one implementation, database manager 114 may receive a user request to insert/add a data row to an indexed table in database 130. Database manager 114 may provide an indication of the row addition to the index manager 116. In order to create an index entry in the index associated with the indexed table using the data value of the indexed column, index manager 116 may determine which index area (e.g., standard or additional index areas) the index is housed in and may accordingly add the index entry to the B-tree+ index structure associated with the index. Index manager 116 may access the index definitions associated with the indexed table/column(s) to determine the index area that houses the index.

In one implementation, database manager 114 may receive a user request to delete or update a data row in an indexed table. Database manager 114 may provide an indication of the data row deletion/update to the index manager 116. Index manager 116 may determine which index area (e.g., standard or additional index areas) houses the index associated with the indexed table. Index manager 116 may access the index definitions associated with the indexed table/column(s) to determine the index area that houses the index. Index manager 116 may accordingly delete the appropriate index entry or update the appropriate index entry in the index based on the determination.

In one implementation, database manager 114 may receive a user request to retrieve particular information from an indexed table (for example, in the form of search queries specifying an indexed column). Database manager 114 may provide an indication of the request to the index manager 116. Index manager 116 may access the index definitions associated with the indexed table/column(s) to determine the index area that houses the index associated with the indexed column specified in the user request. Index manager 116 may perform an index access in the determined index area to determine one or more index entries that include one or more data values associated with the indexed column specified in the user request. Index manager 116 may provide to database manager 114, the data row pointers from the determined index entries that identify or serve as pointers to specific row(s) in the DASD (not shown) that stores the database table that contains the data values. Database manager 114 may accordingly retrieve one or more data rows associated with the data row pointers provided by the index manager 116 from the DASD that stores the database table. Database manager 114 may provide the retrieved data row to the user in response to the user request. In one implementation DASD 140 may store the database table and the indexes in separate locations.

In one implementation, indexes from one index area may be moved to another index area as the business processing needs change allowing for additional flexibility without requiring any application level change.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for partitioning a global index, the method executed by one or more processors configured to perform a plurality of operations, the operations comprising:
   accessing one or more index definitions associated with one or more tables in a relational database, the one or more index definitions identifying one or more physical index areas that indicate a location where one or more indexes associated with the one or more tables is to be stored, the one or more physical index areas comprising a standard physical index area and at least one other physical index area distinct from the standard physical index area;
   initializing the at least one other physical index area to form an initialized at least one other physical index area;
   partitioning the global index based on at least one index definition of the one or more index definitions, said partitioning comprising separating at least one index associated with the at least one index definition from the global index into at least one index dataset, the at least one index dataset comprising one or more index entries associated with the at least one index; and
   storing the at least one index dataset into the initialized at least one other physical index area identified in the at least one index definition.

2. The computer-implemented method of claim 1, wherein said partitioning further comprises:
   partitioning a B-tree+ index structure for the global index to create at least one separate B-tree+ index structure for the at least one index dataset.

3. The computer-implemented method of claim 1, the operations further comprising:
   in response to an addition of a data row in at least one table of the one or more tables, determining a physical index area which stores the index associated with the at least one table based on the one or more index definitions; and
   creating an index entry associated with the added data row in the determined index area.

4. The computer-implemented method of claim 1, the operations further comprising:
   creating a new index;
   determining at least one physical index area from the one or more physical index areas where the created new index is to be stored based on an index definition associated with the created new index;
   determining whether the determined at least one physical index area has been initialized; and in response to a determination that the determined physical index area has been initialized, adding the created new index to the determined physical index area.

5. The computer-implemented method of claim 1, the operations further comprising:
   determining whether at least one index of the one or more indexes is to be stored in the at least one other physical index area or the standard physical index area based on the one or more index definitions;
   in response to a determination that the at least one index is to be stored in the at least one other physical index area, initializing the at least one physical index area to form an initialized at least one other physical index area;
   partitioning the global index by separating the at least one index from the global index into at least one index dataset;
   storing the at least one index dataset into the initialized at least one other physical index area; and
   in response to a determination that the at least one index is to be stored in the standard physical index area, storing the at least one index in the standard physical index area.

6. A non-transitory computer-readable storage medium having one or more computer-readable instructions thereon which when executed by one or more processors cause the one or more processors to:
   access one or more index definitions associated with one or more tables in a relational database, the one or more index definitions identifying one or more physical index areas that indicate a location where one or more indexes associated with the one or more tables is to be stored, the one or more physical index areas comprising a standard physical index area and at least one other physical index area distinct from the standard physical index area;
   initialize the at least one other physical index area to form an initialized at least one other physical index area;
   partition the global index based on at least one index definition of the one or more index definitions, said partitioning comprising separating at least one index associated with the at least one index definition from the global index into at least one index dataset, the at least one index dataset comprising one or more index entries associated with the at least one index; and
   store the at least one index dataset into the initialized at least one other physical index area identified in the at least one index definition.

7. The non-transitory computer-readable storage medium of claim 6, wherein the one or more computer-readable instructions causing the one or more processors to partition the global index further include instructions causing the one or more processors to:
   partition a B-tree+ index structure for the global index to create at least one separate B-tree+ index structure for the at least one index dataset.

8. The non-transitory computer-readable storage medium of claim 6, wherein the one or more instructions further cause the one or more processors to:
   in response to an addition of a data row in at least one table of the one or more tables, determine a physical index area which stores the index associated with the at least one table based on the one or more index definitions; and
   create an index entry associated with the added data row in the determined index area.

9. The non-transitory computer-readable storage medium of claim 6, wherein the one or more instructions further cause the one or more processors to:
   create a new index;
   determine at least one physical index area from the one or more physical index areas where the created new index is to be stored based on an index definition associated with the created new index;
   determine whether the determined at least one physical index area has been initialized; and
   in response to a determination that the determined physical index area has been initialized, add the created new index to the determined physical index area.

10. The non-transitory computer-readable storage medium of claim 6, wherein the one or more instructions further cause the one or more processors to:
    determine whether at least one index of the one or more indexes is to be stored in the at least one other physical index area or the standard physical index area based on the one or more index definitions;
    in response to a determination that the at least one index is to be stored in the at least one other physical index area, initialize the at least one physical index area to form an initialized at least one other physical index area;
    partition the global index by separating the at least one index from the global index into at least one index dataset;
    store the at least one index dataset into the initialized at least one other physical index area; and
    in response to a determination that the at least one index is to be stored in the standard physical index area, store the at least one index in the standard physical index area.

11. A computer-implemented system for partitioning a global index, the system comprising:
    one or more processors configured to:
      receive a request to partition a global index associated with one or more tables in a relational database, wherein the request identifies one or more index definitions to be separated from the global index;
      initialize one or more physical index areas to form initialized one or more physical index areas, wherein the initialized one or more physical index areas are distinct from a standard physical index area;
      partition the global index based on at least one index definition of the one or more index definitions, said partitioning comprising separating at least one index associated with the at least one index definition from the global index into at least one index dataset, the at least one index dataset comprising one or more index entries associated with the at least one index; and
      store the at least one index dataset into the initialized one or more physical index areas.

12. The computer-implemented system of claim 11, wherein the one or more processors configured to partition the global index further comprise one or more processors configured to:
    partition a B-tree+ index structure for the global index to create at least one separate B-tree+ index structure for the at least one index dataset.

13. The computer-implemented system of claim 11, wherein the one or more processors are further configured to:
    in response to an addition of a data row in at least one table of the one or more tables, determine a physical index area which stores the index associated with the at least one table based on the one or more index definitions; and
    create an index entry associated with the added data row in the determined index area.

14. The computer-implemented system of claim 11, wherein the one or more processors are further configured to:

create a new index;

determine at least one physical index area from the one or more physical index areas where the created new index is to be stored based on an index definition associated with the created new index;

determine whether the determined at least one physical index area has been initialized; and in response to a determination that the determined physical index area has been initialized, add the created new index to the determined physical index area.

15. The computer-implemented system of claim 11, wherein the one or more processors are further configured to:

determine whether at least one index of the one or more indexes is to be stored in at least one physical index area of the one or more physical index areas or the standard physical index area based on the one or more index definitions;

in response to a determination that the at least one index is to be stored in the at least one physical index area, initialize the at least one physical index area to form an initialized at least one other physical index area;

partition the global index by separating the at least one index from the global index into at least one index dataset;

store the at least one index dataset into the initialized at least one physical index area; and in response to a determination that the at least one index is to be stored in the standard physical index area, store the at least one index in the standard physical index area.

* * * * *